(12) United States Patent
Thiam (10) Patent No.: US 8,812,436 B2
(45) Date of Patent: Aug. 19, 2014

(54) SCHEDULE BASED DATA LIFECYCLE MANAGEMENT

(75) Inventor: Alioune Thiam, Hugo, MN (US)

(73) Assignee: Symantec Corporation, Mountain View, CA (US)

( * ) Notice: Subject to any disclaimer, the term of this patent is extended or adjusted under 35 U.S.C. 154(b) by 29 days.

(21) Appl. No.: 12/773,350

(22) Filed: May 4, 2010

(65) Prior Publication Data
US 2011/0276539 A1 Nov. 10, 2011

(51) Int. Cl.
*G06F 17/30* (2006.01)

(52) U.S. Cl.
USPC .......................................... 707/609; 707/634

(58) Field of Classification Search
USPC .................................. 707/609, 634
See application file for complete search history.

(56) References Cited

U.S. PATENT DOCUMENTS

| | | | |
|---|---|---|---|
| 6,460,055 B1 | 10/2002 | Midgley et al. | |
| 7,536,585 B1 | 5/2009 | Keeton et al. | |
| 7,680,830 B1 | 3/2010 | Ohr et al. | |
| 7,979,649 B1 | 7/2011 | Thiam et al. | |
| 7,987,325 B1 | 7/2011 | Patil et al. | |
| 8,555,247 B2 * | 10/2013 | Keller | 717/120 |
| 8,615,501 B2 * | 12/2013 | Lorenz et al. | 707/694 |
| 2004/0205391 A1 * | 10/2004 | Thompson | 714/13 |
| 2005/0015414 A1 * | 1/2005 | Blea et al. | 707/203 |
| 2005/0076070 A1 * | 4/2005 | Mikami | 707/204 |
| 2005/0081007 A1 | 4/2005 | Gold et al. | |
| 2005/0278391 A1 * | 12/2005 | Spear et al. | 707/201 |
| 2006/0053304 A1 | 3/2006 | Fries et al. | |
| 2007/0055716 A1 * | 3/2007 | Mikami | 707/204 |
| 2007/0271306 A1 * | 11/2007 | Brown et al. | 707/200 |

OTHER PUBLICATIONS

"BLM Archiver Operator Manual"; Asigra; Generated on Mar. 29, 2010; pp. 1-146.
"Designing and Implementing Backups Using Storage Lifecycle Policies"; Alex Davies; White Paper; Symantec; Nov. 2007; pp. 1-35.
International Application No. PCT/US2011/034909 Search Report and Written Opinion mailed Oct. 18, 2011.
Office Action from European Patent Application No. 11722651.4, mailed Aug. 21, 2013, pp. 1-5.

* cited by examiner

*Primary Examiner* — Kim Nguyen
(74) *Attorney, Agent, or Firm* — Rory D. Rankin; Meyertons, Hood, Kivlin, Kowert & Goetzel, P.C.

(57) ABSTRACT

A system and method for defining a separate lifecycle policy for each of one or more data images. A backup server is configured to select a first point-in-time value, which indicates when to begin moving a data image from a first data storage medium to a second storage medium. The point-in-time value corresponds to a calendar date and an hour or hours of the day. The backup server is configured to continue selecting a respective point-in-time value for each data storage medium within a tiered storage hierarchy in order to define the lifecycle policy. The backup server may be further configured to delete a copy of the data image on a source data storage medium when completion of a move of the data image to a destination data storage medium is detected. Further, the backup server may detect scheduling conflicts between two or more lifecycle policies.

15 Claims, 4 Drawing Sheets

SCHEDULE BASED DATA LIFECYCLE MANAGEMENT

BACKGROUND OF THE INVENTION

1. Field of the Invention

This invention relates to the field of computer processing and, more particularly, to defining a time-based lifecycle policy for a data image.

2. Description of the Related Art

As computer memory storage and data bandwidth increase, so does the amount and complexity of data that business and industry manage each day. A large portion of the data that may be managed in an enterprise involves content managed for a company or workgroup. Such information may include electronic documents, announcements, tasks, discussion topics, and so forth. Depending on the business value of the information, access to certain information may be secure and private while other information may have wider or even public access.

Because the various examples of stored data may frequently contain crucial information, the contents of information servers and end-user systems may be backed up to a backup storage to prevent loss of data. In such a case, the dedicated server and storage subsystem may include a backup system. A backup system attempts to reduce the amount of data and time to backup data to protect a machine. Some methods use de-duplication to reduce the amount of data to backup, but such methods may still consume time and network bandwidth to implement. For example, performing a scheduled backup, even an incremental backup, on an end-user laptop via a network, consumes time to scan files and detect changed files. The scanning and detecting of files consumes a large amount of time prior to using a de-duplication or other method.

In addition to consuming a large amount of time in performing backups, administering and supporting an information technology (IT) infrastructure on a large number of end-user systems presents a significant challenge. An IT administrator may develop a management system for data backup and data protection; data recovery, restore, and restart; archiving and long-term retention; and day-to-day processes and procedures necessary to manage a storage architecture. This management system, which may be referred to as an information lifecycle management (ILM), refers to a set of strategies for administering storage systems on computing devices. Operational aspects of ILM include applying certain policies to the effective management of information throughout its useful life.

The utilization of ILM allows a user to automatically migrate a backup image from one storage tier to another. Current methods utilize an as-soon-as-possible (ASAP) approach, an available capacity approach, or a data classification approach for determining when to perform a duplication of a backup image. However, utilizing the ASAP approach is problematic because a corresponding storage resource may be utilized by another backup or other operation. Regarding the available capacity approach, again, another operation may be accessing the storage resource. In addition, it may be difficult to determine an available amount of disk space that provides consistent results. If a predetermined limit, such as a high watermark value, is set too high, then one or more backup operations may fail due to insufficient available storage space. If the predetermined limit, such as a low watermark value, is set too low, then some available storage space may not be sufficiently utilized. For the data classification based solution, data may be moved to another storage tier too early, which lengthens a restore operation, since the data is in the other storage tier. Other times, the data may be moved to another storage tier too late, which causes the current storage tier to become near full. Now backup operations lengthen in duration and capacity costs increase.

In view of the above, improved systems and methods for defining a time-based lifecycle policy to a data image are desired.

SUMMARY OF THE INVENTION

Systems and methods for defining a time-based lifecycle policy for a data image are contemplated.

In one embodiment, a computer system comprises a backup server coupled to multiple data storage media and at least one client computer coupled to a data storage medium included in the multiple data storage media. This data storage medium stores a backup copy of a data image corresponding to the client computer. The backup server is configured to select a first point-in-time value, which indicates when to begin moving the data image to a second storage medium of the plurality of data storage media. The point-in-time value may correspond to a calendar date and an hour or hours of the day. In one embodiment, this second data storage medium is associated with a lower tier in a tiered storage hierarchy than the first data storage medium. For example, the second data storage medium may be accessed less frequently than the first data storage medium. The second data storage medium may be used for data recovery operations, rather than daily access during work hours.

The second storage medium may not correspond to a final storage medium within the tiered storage hierarchy. The backup server may be configured to continue selecting a respective point-in-time value for each data storage medium within the tiered storage hierarchy in order to define the lifecycle policy. The backup server may be further configured to delete a copy of the data image on a source data storage medium when completion of a move of the data image to a destination data storage medium is detected. Further, the backup server may detect scheduling conflicts. Criteria for defining a scheduling conflict may include at least one of the following: calendar information and hours or other time increments of the day associated with other lifecycle policies, a data class or business value of each of the data images and respective backup images, a current available capacity of each of the storage media, a projected (an estimated) available capacity of each of the storage media upon completion of a scheduled move for each backup/duplication operation of each lifecycle that is scheduled, a size of each of the data images in each of the data formats within each storage media, and a data rate of a backup/duplication operation on each of the storage media.

These and other embodiments will be appreciated upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
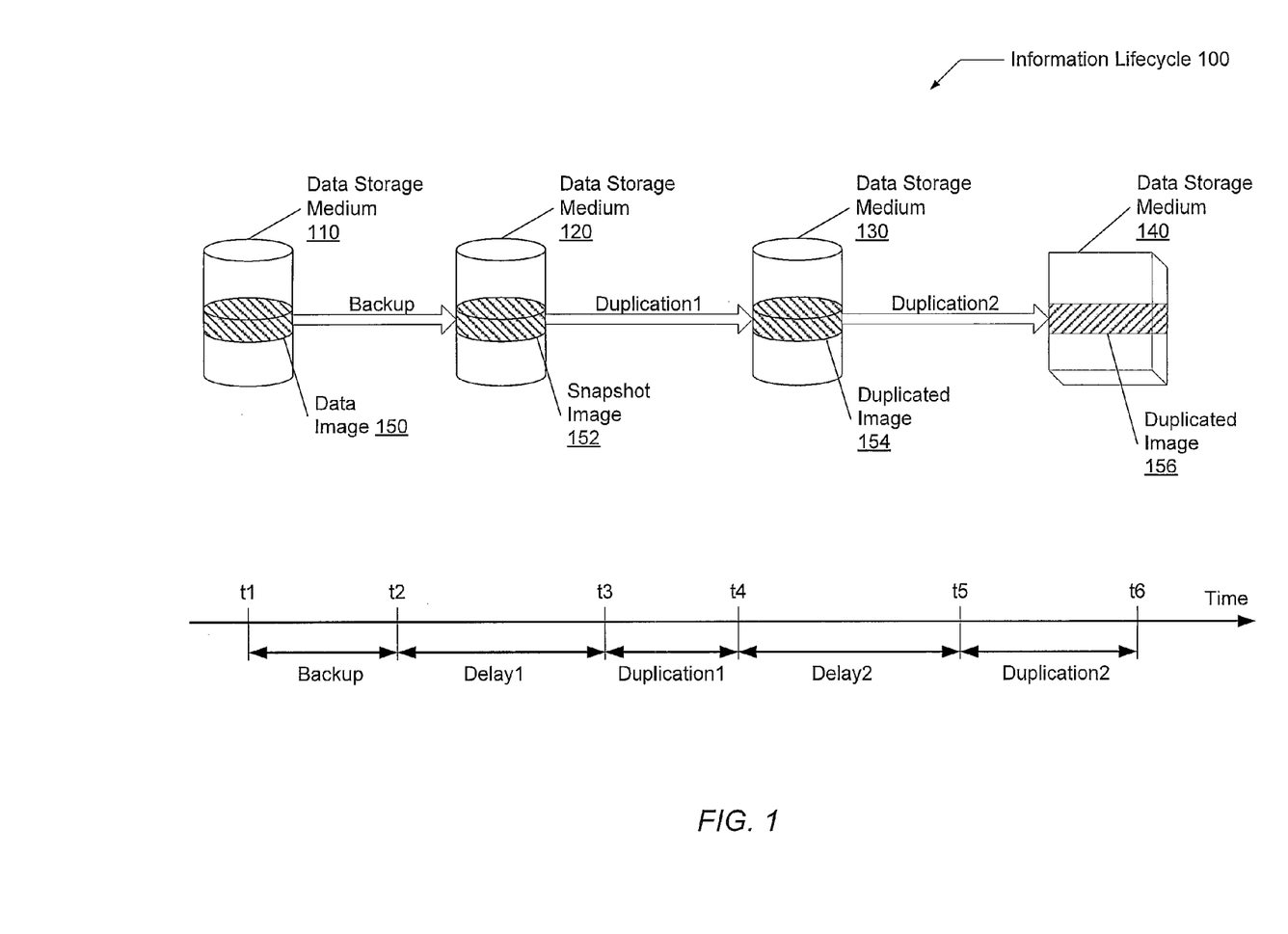
FIG. 1 is a generalized block diagram illustrating one embodiment of an information lifecycle.

Referring to FIG. 1, a generalized block diagram of one embodiment of an information lifecycle 100 is shown. Information lifecycle 100, or simply lifecycle 100, illustrates the managing of a flow of an information system's data and associated metadata from creation and initial storage to the time when the data becomes obsolete and is deleted. A data image may comprise at least one or more files of information, associated metadata, and associated storage arrangement information such as directories, folders, and subfolders. Data image 150 may be stored on a data storage medium 110. In one embodiment, data image 150 is initially stored on data storage medium 110 at time t1. In another embodiment, time t1 may be chosen as an initial point-in-time for lifecycle 100 although data image 150 has been stored on data storage medium 110 for a period of time prior to time t1.

In one embodiment, data storage medium 110 may be a disk drive associated with a file system used for storing data of one or more client computers. A scheduled backup operation may create a copy of data image 150 to be stored on a separate storage medium, such as data storage medium 120. Snapshot image 152 may represent a copy of data image 150. The one or more files in snapshot image 152 may comprise a different file format than a format used to store data image 150. The backup operation may be a predetermined scheduled event by an information technology (IT) administrator. The backup operation that creates snapshot image 152 may be scheduled during a particular time window of availability, wherein a determination is made that no concurrent access of data storage medium 120 occurs during the particular time window of availability. For example, it may be determined another lifecycle policy, which is not shown, is not concurrently accessing data storage medium 120 when the backup operation is occurring. In one embodiment, data image 150 may be deleted, or expired, from data storage medium 110 after the snapshot image 152 is created. This deletion may occur immediately or a predetermined time after the snapshot creation according to a schedule by the IT administrator.

The process described above may be repeated for subsequent moves of the data image 150. Continuing with the flow of data illustrated in lifecycle 100, a predetermined subsequent duplication operation, which is shown as Duplication1 in FIG. 1, may move the snapshot image 152 from data storage medium 120 to data storage medium 130. This subsequent duplication operation may occur a predetermined delay, which is shown as Delay1 in FIG. 1, after the completion of the initial backup operation. A copy of the data stored in snapshot image 152 is made and represented in FIG. 1 by duplicated image 154. As used herein, the term "duplication" refers to a copy operation that occurs after an initial backup operation of a data image, wherein the duplication operation is performed on a snapshot image or another subsequent copy of the snapshot image.

The duplication operation that creates duplicated image 154 may be scheduled during a particular time window of availability. For example, the time window that occurs between time t3 and time t4 is a time window of availability for the first duplication operation. In one embodiment, the identified point-in-time values t3 and t4 may be chosen by a system administrator utilizing a backup application comprising a graphical user interface (GUI). A given identified point-in-time value may be qualified by one or more conditions. Otherwise, a conflict may occur and a message within a GUI may be presented to the system administrator to provide an opportunity to remove conflicts by modifying one or more stored values corresponding to existing lifecycle policies. For example, one condition for a time window for a first duplication operation (shown as Duplication1 in FIG. 1) may be the time window does not overlap the time window for the backup operation by more than a predetermined threshold. In one embodiment, the condition may not allow any overlap. In another embodiment, the condition may allow an overlap of a half hour or other chosen time duration. The threshold may indicate a tolerance, if any, for a concurrent access of data storage medium 130 by the backup operation and the first duplication operation. In addition, other backup and duplication operations may be occurring for other data images not shown. Concurrent access of a given data storage medium may slow both backup and duplication operations enough to prevent these operations from finishing within a predetermined acceptable duration of time.

In addition to the overlap condition described above, other conditions may be used to determine whether a scheduling conflict has occurred. For example, it may be determined that two or more time windows for a first duplication operation corresponding to two or more data images may be allowed to overlap. The time window between time t3 and time t4 may be used for snapshot image 152 and another snapshot image not shown. The point-in-time value t3 may indicate when to allow initial movement of a snapshot image from data storage medium 120 to data storage medium 130. A selection of which snapshot image to prioritize first for duplication may be based on other conditions in addition to the identified point-in-time value t3. These other conditions may include at least one of the following: a current available capacity of a source data storage medium or a destination data storage medium, a business value of the corresponding data image, an age of the data image, and a size of the data image. Other conditions are possible and contemplated. Similar to the deletion of data image 150, snapshot image 152 may be deleted, or expired, from data storage medium 120 after the duplicated image 154 is created. This deletion may occur immediately or a predetermined time after the creation of the duplicated image 154.

The movement process described above may be repeated several more times as defined by system administration. For example, another duplication operation, which is shown as Duplication2 in FIG. 1, may move duplicated image 154 from data storage medium 130 to data storage medium 140. This subsequent duplication operation may occur a predetermined delay, which is shown as Delay2 in FIG. 1, after the completion of the previous duplication operation. A copy of the data stored in duplicated image 154 is made and represented by duplicated image 156. Similar to the deletion of snapshot image 152, duplicated image 154 may be deleted, or expired, from data storage medium 130 after the duplicated image 156 is created. This deletion may occur immediately or a predetermined time after the creation of the duplicated image 156. In one embodiment, data storage medium 140 may be a final data storage medium in a lifecycle of data image 150 prior to sending data image 150 to an off-site storage location, an on-site tape storage medium, or otherwise.

Data storage media 110-140 may represent tiered storage. Tiered storage may comprise the assignment of different data classes to different types of storage media in order to reduce total storage cost. Data classes may be based on at least one of the following: predetermined levels of data protection, system performance goals, predetermined business values, and utilization frequency of the data. One or more predetermined policies may be utilized in software to automatically assign data to particular media.

An example of tiered storage may include a first tier for the storage of mission-critical or recently accessed files. The first tier storage may store data on expensive and high-quality media such as double-parity RAIDs (redundant arrays of independent disks). The tiered storage may include a second tier for the storage of financial and classified files. The second tier may store data on less expensive media in conventional storage area networks (SANs). As the tier number in the tiered storage system is increased, both the business value of the data and the cost of corresponding storage may decrease. For example, the tiered storage may include a third tier for the storage of event-driven, rarely used, or unclassified files. The third tier may store data on recordable compact discs (CD-Rs) or tapes. A selection of a type of storage to use for data storage media 110-140 may be based on the data class of a given data image 150.

Figure 2:
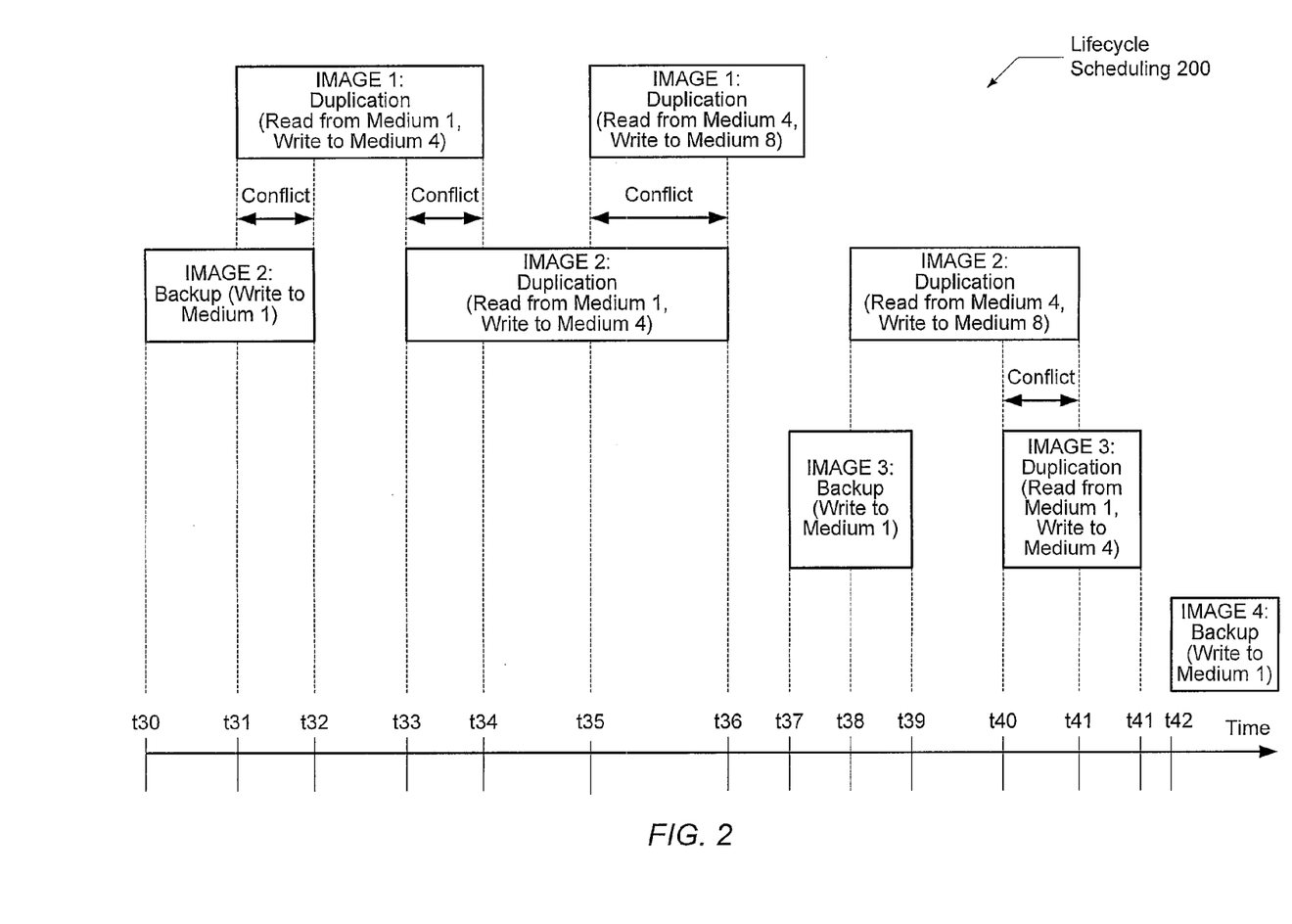
FIG. 2 is a generalized block diagram illustrating one embodiment of time-based lifecycle scheduling.

Turning now to FIG. 2, a generalized block diagram of one embodiment of time-based lifecycle scheduling 200 is shown. A portion of a lifecycle for each of four data images is shown. Taking a data image as an example, such as Image2, it is seen a backup operation is scheduled to begin at time t30 and last in duration from time t30 to time t32. The backup operation comprises memory write accesses to a data storage medium referred to as Medium1. A predetermined delay shown from time t32 to time t33 occurs before a subsequent backup operation begins at time t33. In one embodiment, as used herein the term "backup" refers to a process whereby a dataset is copied and converted to another format and stored (e.g., for possible future restoration). In one embodiment, the term "duplication" refers to a process whereby a copy of a dataset is made and stored—without a change in format. Alternatively, duplication may entail moving a dataset from one location to another without leaving a copy at the source location. In other embodiments a backup may not entail a change in format, or a duplication may entail some format change. Numerous such alternative embodiments are possible and are contemplated. A first duplication may last in duration from time t33 to time t36. This first duplication operation comprises memory read accesses from Medium1 and memory write accesses to Medium4. The data storage media Medium1 and Medium4 may be comprised within different tiers of a tiered storage system.

As shown in FIG. 2, continuing with an example regarding data image Image2, a second predetermined delay may occur between time t36 and time t38. A second duplication may last in duration from time t38 to time t41. The second duplication operation comprises memory read accesses from Medium4 and memory write accesses to Medium8. The data storage media Medium4 and Medium8 may be comprised within different tiers of a tiered storage system. One or more delays and duplication operations may occur afterward, which are not shown. Otherwise, after a predetermined delay, the data image Image2 may be deleted from the tiered storage. For data images Image1, Image3, and Image4, similar operations and delays are shown although occurring at different times as shown in FIG. 2.

A scheduled time window is shown as durations of time between marked points in time. For example, a time window for the duplication operation for Image1 is between the time t31 and the time t34. A scheduled time window for the backup operation for Image2 is between the time t30 and the time t32. Alternatively, time windows may be specified by a duration of time beginning at a given start time corresponding to a calendar date and an hour or hours of the day. For example, a duration of time between time t31 and time t34 may be 2 hours. The time t31 may correspond to a time of 5:00 A.M. on March 14. Therefore, the duplication operation for Image1 may be specified to start at 5:00 A.M. on March 14 and end at 07:00 A.M. on March 14. Therefore, a time window of 2 hours is specified to occur on a particular calendar day.

The scheduling information shown in FIG. 2 may be presented on a graphical user interface (GUI) to an IT administrator. Additional information, which is not shown in order to simplify the illustration, may be presented in the GUI to a user such as at least one of the following: calendar information, hours or other time increments of the day, a data class or business value of each of the data images and respective backup images, a current available capacity of each of the storage media, a projected (an estimated) available capacity of each of the storage media upon completion of a scheduled move for each backup/duplication operation of each lifecycle that is scheduled, a size of each of the data images in each of the data formats within each storage media, a data rate of a backup/duplication operation on each of the storage media, a relative or absolute financial cost of the data storage medium, and an estimated acceleration window wherein a backup/duplication operation is estimated to finish faster than a scheduled time window (e.g. for Image2, duplication may be estimated to finish in an accelerated window between time t33 and time t35 rather than the scheduled window between time t33 and time t36). In addition to presenting the above criteria to a user, the above criteria may be used to detect scheduling conflicts. The detecting of scheduling conflicts is described next.

A detection of scheduling conflicts may include at least identifying periods of time a given storage medium is accessed by two different lifecycle policies. For example, referring to scheduling 200 shown in FIG. 2, between the time t31 and the time t32, the storage medium labeled Medium1 has memory read accesses from a duplication operation for Image1 and memory write accesses from a backup operation for Image2. The concurrent accesses may delay a start time for each of the respective accesses and additionally cause a respective duration for each access to lengthen. Therefore, the operations may slow down enough to possibly not finish in a scheduled time window. Here the scheduled time window for the duplication operation for Image1 is between the time t31 and the time t34. The scheduled time window for the backup operation for Image2 is between the time t30 and the time t32.

The detection of conflicts may also include identifying a period of time a given storage medium is accessed for daily business operations. For example, a backup operation may not be allowed to be scheduled between 8:00 A.M. and 6:00 P.M. on a weekday. Users access a respective data storage medium that will have memory read accesses from the backup operation. Similarly, a first duplication operation may not be allowed to be scheduled during these business hours. Users may access a respective data storage medium for restore operations that will have memory read accesses from the duplication operation. These time windows may be shown as blocked in a windowpane within a GUI to show an IT administrator that operations may not be scheduled during these times.

When scheduling a backup/duplication operation for a given lifecycle policy for a given data image, the detection of a scheduling conflict for a proposed time window may additionally include the presentation criteria described earlier. For example, a proposed time window may not overlap with a time window of an earlier scheduled lifecycle for a given data storage medium, but the given data storage medium may have reached a capacity high watermark value. Other combinations of checks using the above-described criteria are possible and contemplated. When conflicts are automatically detected and presented to an IT administrator, such as through a window pane of a GUI, the scheduling of backup/duplication operations for a lifecycle of a data image may become less burdensome.

During a defining stage for a lifecycle policy for a given data image, the time-based approach through a GUI may additionally offer possible solutions to detected conflicts. For example, the software application may determine a new value for a time window or a data storage medium of an earlier scheduled operation. This earlier backup/duplication operation may be accessing a same data storage medium as the proposed backup/duplication operation, thus, causing a conflict. The new values may still allow the earlier operation to complete successfully and now allow the proposed operation to be scheduled. For example, a user may have scheduled the earlier operation to last 4 hours. The software application may determine through the backup image size and data rate for the data storage medium that the earlier operation may last 3 hours. Therefore, the earlier operation may be scheduled one hour forward or backward depending on which direction resolves the conflict. Any new values for the earlier operation may be presented to the user via a GUI.

Continuing with finding resolutions for conflicts, similar to the solution described above, the software application may determine a new value for a time window or a data storage medium of the proposed backup/duplication operation. Utilizing the selections by a user, the application may perform calculations to determine whether one or more new values are possible, and, if so, present the new values to the user via a GUI. The calculations may also include as inputs the criteria listed earlier for detecting conflicts.

As described above regarding presenting information to an IT administrator via a GUI, a definition of a time-based lifecycle policy for a data image may comprise time windows. The time windows may be combined with data class, available capacity, data rate, and other approaches when determining an information lifecycle. The time windows offered by a software application and presented via a GUI or a command line interface allows a user to specify exactly when a backup/duplication operation is performed for a given data image and on what data storage media.

The user may utilize a calendar-based approach and specify a date and a time window for a respective backup/duplication operation in a backup application, such as Symantec NetBackup®. The backup application may associate or attach a time-based schedule to each destination, or data storage medium. In this manner, when a user creates a data storage lifecycle policy that includes at least a snapshot destination and a backup/duplication destination, a schedule is attached to the respective backup/duplication operations. The schedules specify when each of the operations will take place. For example, after a snapshot image is created, a duplication operation may occur two weeks later to move the snapshot image to a disk storage. During these two weeks, data recovery may be performed using the snapshot image. The expectation may be that the snapshot image expires and is deleted after two weeks. Therefore, multiple copies of the respective data image are not kept. A second schedule defined in the duplication operation may be used to move the respective backup image on disk to tape for long-term retention. This second schedule may be due a month later.

Figure 3:
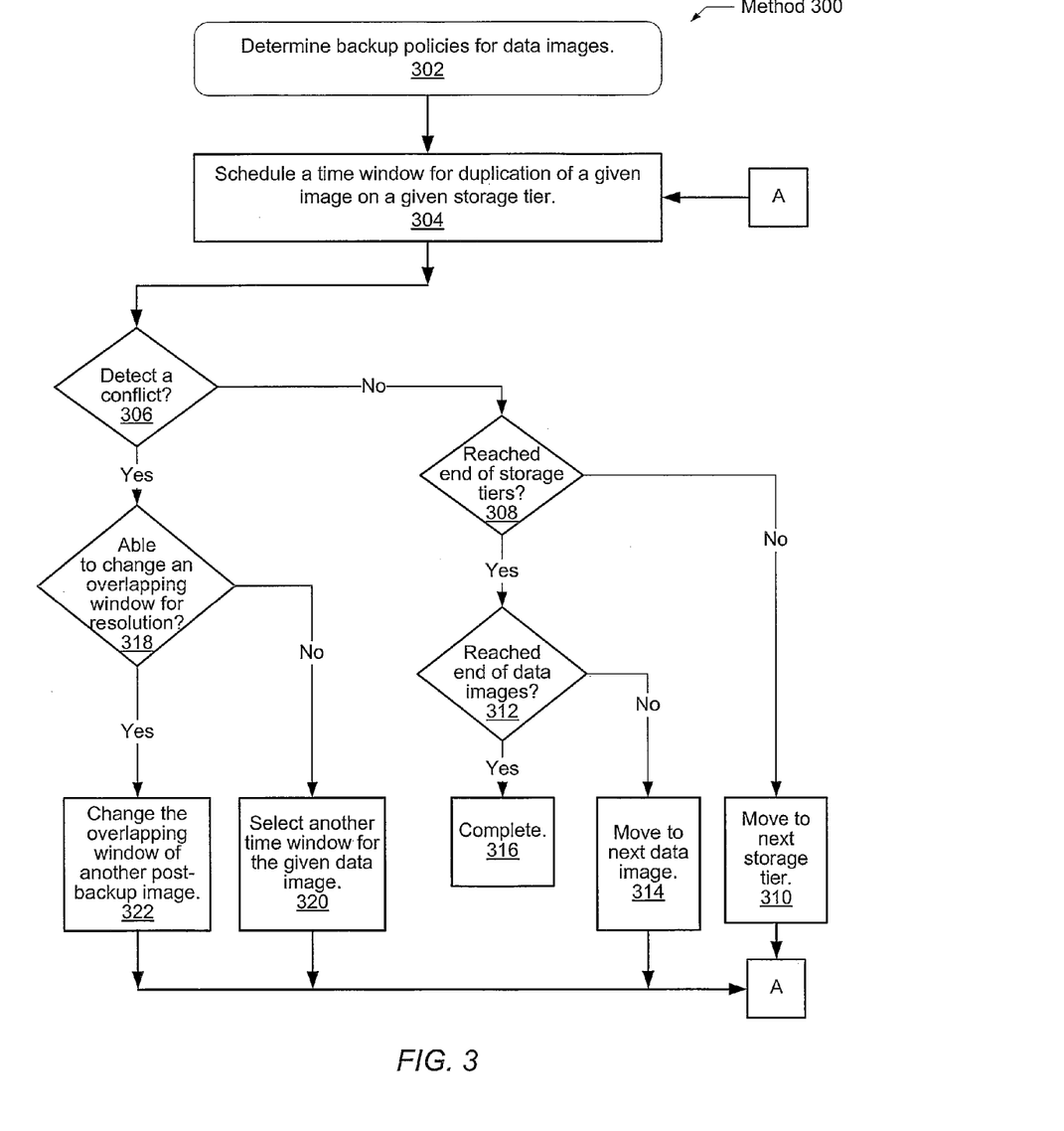
FIG. 3 is a flow diagram illustrating another embodiment of a method for defining a time-based lifecycle policy to a data image.

Referring to FIG. 3, an overview of one embodiment of a method 300 for defining a time-based lifecycle policy for a data image is shown. For purposes of discussion, the data is described as corresponding to a website. However, the methods and mechanisms described herein are applicable to other, non-website, data as well. The components embodied in the computer system 100 described above may generally operate in accordance with method 200. For purposes of discussion, the steps in this embodiment are shown in sequential order. However, some steps may occur in a different order than shown, some steps may be performed concurrently, some steps may be combined with other steps, and some steps may be absent in another embodiment.

In block 302, policies for backup and duplication operations within a lifecycle are determined for data images. For example, the policies may include determining a number of tiers in a tiered storage, a type and a number of storage media, a time duration for an image to be stored on a given storage medium, the hours of the day to block from particular operations, and so forth. In block 304, a user may propose a time-based schedule for a backup/duplication operation for a given data image on a given storage tier. The schedule may comprise an indication of a point-in-time such as a calendar date, an hour of the day, or a predetermined duration of time after a corresponding previous move of a corresponding data image. In order to specify the proposed schedule, a user may select a window in a GUI, select and drag a window in a GUI, enter values on a command line, or otherwise. Detection of scheduling conflicts may utilize the criteria described earlier.

If a conflict is not detected for the proposed time-based schedule (conditional block 306), and the end of the storage tiers for the information lifecycle is not reached (conditional block 308), then in block 310, a next storage tier in the lifecycle may be selected. The information lifecycle of the currently scheduled data image may have the proposed time-based schedule associated with a corresponding data storage medium. Then control flow of method 300 returns to block 304 via block A. In block 304, a next proposed time-based schedule may be entered. If the end of the storage tiers for the information lifecycle is reached (conditional block 308), and if there are more data images to schedule (conditional block 312), then in block 314, a next data image is selected. The information lifecycle of the currently scheduled data image may have the proposed time-based schedule associated with a corresponding data storage medium. Then control flow of method 300 returns to block 304 via block A. In block 304, a next proposed time-based schedule may be entered. If there are no more data images to schedule a lifecycle (conditional block 312), then the time-based scheduling of lifecycles is complete in block 316. Alternatively, control flow of method 300 may return to conditional block 306. For example, an IT administrator may schedule multiple lifecycle policies with no conflicts. However, a conflict that is not checked by an application running on a backup server may occur later. Although no new scheduling has occurred, conflicts may still possibly occur and one or more preexisting lifecycle policies may be revised to remove the conflict.

If a conflict is detected for the proposed time-based schedule (conditional block 306), and it is determined an earlier conflicting backup/duplication operation may have its schedule successfully changed without causing other conflicts (conditional block 318), then in block 322, the determined changes may occur. The determination of the changes may occur as described earlier. The information lifecycle of the earlier backup/duplication operation may be modified or accelerated to provide a new definition associated with a corresponding data storage medium. In addition, the information lifecycle of the currently scheduled data image may have the proposed time-based schedule associated with a corresponding data storage medium. Then control flow of method 300 returns to block 304 via block A. In block 304, a next proposed time-based schedule may be entered.

If a conflict is detected for the proposed time-based schedule (conditional block 306), and it is determined an earlier conflicting backup/duplication operation may not have its schedule successfully changed without causing other conflicts (conditional block 318), then in block 320, the proposed schedule for the current data image and the current data storage medium is changed. A proposed change may be offered using calculations described earlier. Otherwise, criteria of the system may be presented to the user, such as via a GUI, in order for the user to adjust the proposed time-based schedule. Then control flow of method 300 returns to block 304 via block A. In block 304, a next proposed time-based schedule may be entered.

Figure 4:
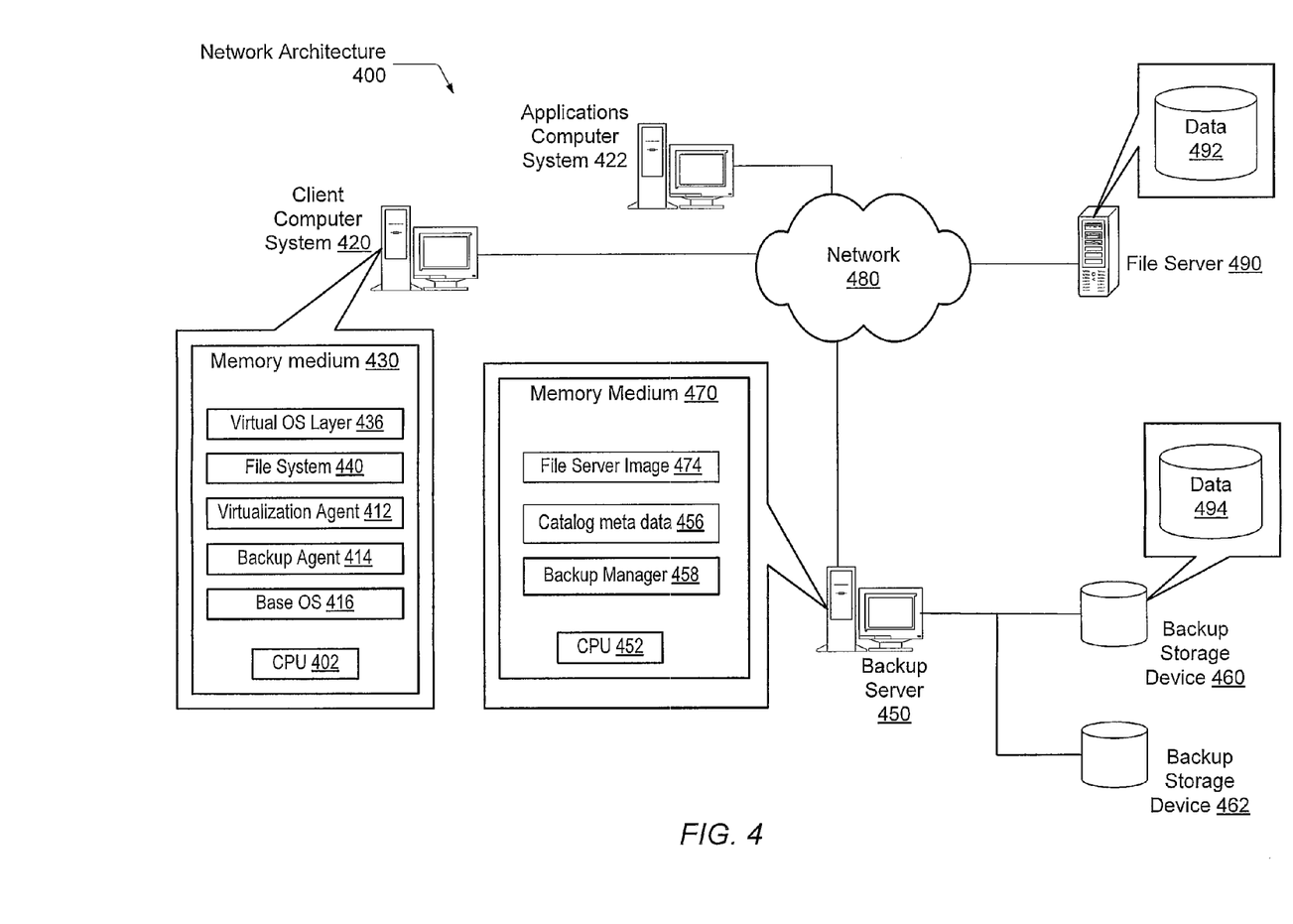
FIG. 4 is a generalized block diagram illustrating one embodiment of a network architecture.

Turning now to FIG. 4, one embodiment of a network architecture 400 is shown. Network architecture 400 includes applications computer system 422 and client computer system 420 interconnected through a network 480 to one another, to a file server 490, and to a backup server 450. Disk storage 460 and disk storage 462 is coupled to backup server 450. Network 480 may include a variety of techniques including wireless connection, direct local area network (LAN) connections, wide area network (WAN) connections such as the Internet, a router, and others. Network 480 may comprise one or more LANs that may also be wireless. Network 480 may further include remote direct memory access (RDMA) hardware and/or software, transmission control protocol/internet protocol (TCP/IP) hardware and/or software, router, repeaters, switches, grids, and/or others.

In various embodiments of network architecture 400, applications computer system 422 is representative of any number of servers hosting business-critical applications and database servers. Client computer system 420 is representative of any number of stationary or mobile computers such as servers, desktop PCs, laptops, handheld computers, etc. Client 420 may include at least a single processor 402 and a memory medium 430. Client 420 may use processor 402 to execute instructions of software applications. Client 420 may contain one or more software applications on its memory medium 430. For example, client 420 may include a backup agent 414. Similarly, client 420 may include a virtualization agent 412 for use in creating and maintaining virtual environments in the client.

In some embodiments, the systems 422 and 420 may include an operating environment, e.g. an operating system, such as base OS 416 and/or a virtual OS layer 436. In various embodiments, the provided base OS 416 may be any of various operating systems, including MS-DOS®, MS-WINDOWS®, OS/2®, UNIX®, Linux®, Solaris® or another known operating system. In some embodiments, the systems 422 and 420 have only a virtual OS layer 436 provided by an IT administrator using a common image of the layer. In other embodiments, the systems 422 and 420 have both a base OS 416 and a virtual OS layer 436. The operating system may interface between the system hardware and the software applications.

Continuing with the components of the systems 422 and 420, a file system 430 may be included. Similar to a file system on the file server 490, the backup server 450, or any other computer system or server, file system 440 may operate as a special-purpose database for the storage, organization, manipulation, and retrieval of data. A user may browse the directories stored on a corresponding data storage medium via the file system 440.

The file server 490 in network architecture 400 may be any kind of server configured to store data. In one embodiment, file server 490 may be a Network-Attached Storage (NAS) device. The file server 490 may be a computer specialized for providing file storage services to computer systems 422 and 420 and other information servers (not shown). The operating system and other software on the file server 490 provide the functionality of file systems, the access to files, and the management of these functionalities. The file server 490 may include one or more hard disks, often arranged into logical, redundant storage containers or RAID arrays (redundant arrays of inexpensive/independent disks). The data 492 may be stored on one or more of the hard disks of the file server 490.

The file server 490 may provide data storage at the file system level. The file server 490 may use file-based protocols such as Network File System (NFS) (popular on UNIX systems), SMB/CIFS (Server Message Block/Common Internet File System) (used with MS Windows systems), or AFP (used with Apple Macintosh Computers). In the example of FIG. 4, files on the file server 490 may be accessed through a Network File System (NFS) interface included in network 480.

Turning now to the backup storage device 460, device 460 may be used to store backup copies of data within the network architecture 400. Backup data 494 may store copies of data 492, copies of data included in computer systems 422 and 420, and copies of data included in other information servers (not shown). Backup storage device 460 may include or be further coupled to several varieties of storage consisting of one or more hard disks, tape drives, server blades, or specialized devices, and may include a variety of memory devices such as RAM, Flash RAM, MEMS (Micro Electro Mechanical Systems) storage, battery-backed RAM, and/or non-volatile RAM (NVRAM), etc. Backup storage device 462 may be used to store backup copies of data stored on device 460. Backup storage device 462 may comprise one or more of the memory devices listed above for backup storage device 460. In one embodiment, when an image is copied on backup storage device 460, corresponding data stored on file server 490 may be deleted. Similarly, when an image is copied on backup storage device 462, corresponding data stored on device 460 may be deleted. A time-based schedule used to define an information lifecycle of a given data image as described earlier may be associated with each of backup storage devices 460 and 462.

In one embodiment, the backup server 450 in network architecture 400 may include a backup application 458. This backup application 458, or "backup manager" may comprise program instructions stored on the memory medium 470 and executable by the processor 452 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations. The backup manager 458 may allow a user to perform time-based scheduling to define an information lifecycle of a given data image as described earlier.

The backup manager 458 on backup server 450 may be configured to create various types of backups of data 492. For example, image based, file based, or other types of backups may be created. In some embodiments, the backup manager 458 may receive user input directing the backup manager 458 to create a backup of a specific system, such as file server 490. In some embodiments, the backup manager 458 may create a backup of a specific system automatically, e.g., the backup manager may be scheduled to perform regular backups of a specific system. The backup manager 458 may create and store the backup, or the file server image 474, in a commonly known file format, such as the Virtual Hard Disk (VHD) format, the V2I format, and the Virtual Machine Disk Format (VMDK) format.

Continuing with a description of a data backup operation, in one embodiment, the backup manager 458 on backup server 450 may create the backup of data 492, such as file server image 474, and store it on the backup storage device 460. In another embodiment, the backup manager 458 may store the backup on the backup server 450, e.g., on a memory medium 470 of the backup server 450, as shown. In yet other embodiments, the backup manager 458 may instead store the backup on another device, e.g., on another computer system (such as another server) connected over the network 480.

In one embodiment, the backup manager 458 may create a backup of computer systems 422 and 420 directly without using file server 490. Such a backup may be performed to protect data on computer systems 422 and 420, which may not yet be updated on file server 490. In some embodiments, the backup manager 458 may automatically create file-by-file backups of computer systems 422 and 420 if they are connected to network 480. In this case, a scheduled regular backup may be implemented, such as a daily or weekly scheduled backup of computer systems 422 and 420.

As part of creating a backup, the backup manager 458 may also create catalog metadata 456 associated with the corresponding files or data images. The catalog metadata 456 created by the backup manager 458 during a backup operation, such as a backup of data on client 420, may include metadata for the files. Metadata may include at least one or more of the following: a data name, data size, a fingerprint of the data, a batch number, as well as data type, version number, ownership, permissions, modification time, error code, etc. A batch number may be used to identify the particular backup operation in which an associated backup entry was created. Other forms of metadata and/or identifiers will be apparent to those of ordinary skill in the art. The catalog metadata 456 may be usable for restore browsing, e.g., at a later time.

It is noted in alternative embodiments, the number and type of clients, servers, and storage devices is not limited to those shown in FIG. 4. Almost any number and combination of servers, desktops, laptops, and mobile clients may be interconnected in network architecture 400 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to network architecture 400.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for defining a lifecycle policy for each of one or more data images, the method comprising:
   selecting a data image stored on a first data storage medium for definition of a first lifecycle, wherein the first lifecycle includes moving the data image from the first data storage medium to a second data storage medium as part of a backup operation;
   presenting to the user, in a graphical user interface, one or more time windows of availability for moving the data image during a duplication operation, wherein the one or more time windows of availability are determined to not overlap a time window for the backup operation by more than a predetermined threshold;
   defining said first lifecycle, wherein said defining comprises:
      identifying a first point-in-time value which indicates both (i) when to automatically initiate movement of the data image from the first data storage medium to a the second data storage medium and (ii) when to automatically delete the data image on the first data storage medium at least after movement of the data image is completed; and
      identifying a second point-in-time value which indicates when to allow initial movement of the data image from the second data storage medium to a third data storage medium;
   storing data corresponding to said first lifecycle, wherein said data comprises data which identifies the data image, the first point-in-time value, the second point-in-time value, the first data storage medium, and the second data storage medium.

2. The method as recited in claim 1, wherein movement of the data image from the second data storage medium to the third data storage medium comprises a duplication operation, and wherein the second point-in-time value further indicates when to delete the data image on the second storage medium at least after movement of the data image is completed.

3. The method as recited in claim 2, further comprising moving the data image during the duplication operation in response to detecting a respective point-in-time value is reached and the data image has priority over another data image when detecting concurrent access of a destination data storage medium, wherein the priority is a based on one or more of: a business value of the data image, an age of the data image, and a size of the data image.

4. The method as recited in claim 1, wherein in addition to the identified second point-in-time value, allowance of the initial movement of the data image during the duplication operation is further qualified by at least one of the following: a current available capacity of the second data storage medium or the third storage medium, a business value of the data image, an age of the data image, and a size of the data image.

5. The method as recited in claim 1, wherein during said defining of the lifecycle, the method further comprises detecting a conflict, wherein the conflict comprises at least one of the following: two or more lifecycle policies include a scheduled concurrent access of a given data storage medium; an available capacity of a given data storage medium has reached a predetermined threshold; a projected available capacity of a given data storage medium upon completion of a scheduled move corresponds to a predetermined threshold; and a projected duration for movement of a given data image exceeds an available time window, wherein in response to detecting said conflict either a previous lifecycle schedule is automatically changed to negate the conflict, or a current lifecycle schedule is automatically changed to negate the conflict.

6. The method as recited in claim 5, wherein in response to detecting said conflict, the method further comprises presenting a message corresponding to the conflict and providing a user an opportunity to modify one or more stored values corresponding to an existing lifecycle.

7. A computer system comprising:
a backup server;
a network; and
one or more client computers coupled to the backup server via the network;
wherein the backup server is configured to:
select a data image stored on a first data storage medium for definition of a first lifecycle, wherein the first lifecycle include moving the data image from the first data storage medium to a second data storage medium as part of a backup operation;
present to the user, in a graphical user interface, one or more time windows of availability for moving the data image during a duplication operation, wherein the one or more time windows of availability are determined to not overlap a time window for the backup operation by more than a predetermined threshold;
define said first lifecycle, wherein said defining comprises:
identifying a first point-in-time value which indicates both (i) when to automatically initiate movement of the data image from the first data storage medium to a second data storage medium and (ii) when to automatically delete the data image on the first data storage medium at least after movement of the data image is completed; and
identifying a second point-in-time value which indicates when to allow initial movement of the data image from the second data storage medium to a third data storage medium;
store data corresponding to said first lifecycle, wherein said data comprises data which identifies the data image, the first point-in-time value, the second point-in-time value, the first data storage medium, and the second data storage medium.

8. The computer system of claim 7, wherein movement of the data image from the second data storage medium to the third data storage medium comprises a duplication operation, and wherein the second point-in-time value further indicates when to delete the data image on the second storage medium at least after movement of the data image is completed.

9. The computer system of claim 7, wherein in addition to the identified second point-in-time value, allowance of the initial movement of the data image during the duplication operation is further qualified by at least one of the following: a current available capacity of the second data storage medium or the third storage medium, a business value of the data image, an age of the data image, and a size of the data image.

10. The computer system of claim 9, further comprising moving the data image during a duplication operation in response to detecting a respective point-in-time value is reached and any other identified qualifying value is reached.

11. The computer system of claim 7, wherein during said defining of the lifecycle, the backup server is further configured to detect a conflict wherein the conflict comprises at least one of the following: two or more lifecycle policies include a scheduled concurrent access of a given data storage medium; an available capacity of a given data storage medium has reached a predetermined threshold; a projected available capacity of a given data storage medium upon completion of a scheduled move corresponds to a predetermined threshold; and a projected duration for movement of a given data image exceeds an available time window, wherein in response to detecting said conflict either a previous lifecycle schedule is automatically changed to negate the conflict, or a current lifecycle schedule is automatically changed to negate the conflict.

12. The computer system of claim 11, wherein in response to detecting said conflict, the backup server is configured to present a message to the conflict and provide the user an opportunity to modify one or more stored values corresponding to an existing lifecycle.

13. A non-transitory computer-readable storage medium storing program instructions for defining a lifecycle policy for each of one or more data images, wherein the program instructions are executable by the processor to:
select a data image stored on a first data storage medium for definition of a first lifecycle, wherein the first lifecycle include moving the data image from the first data storage medium to a second data storage medium as part of a backup operation;
present to the user, in a graphical user interface, one or more time windows of availability for moving the data image during a duplication operation, wherein the one or more time windows of availability are determined to not overlap a time window for the backup operation by more than a predetermined threshold;
define said first lifecycle, wherein said defining comprises:
identifying a first point-in-time value which indicates both (i) when to automatically initiate movement of the data image from the first data storage medium to a second data storage medium and (ii) when to automatically delete the data image on the first data storage medium at least after movement of the data image is completed; and
identifying a second point-in-time value which indicates when to allow initial movement of the data image from the second data storage medium to a third data storage medium;
store data corresponding to said first lifecycle, wherein said data comprises data which identifies the data image, the first point-in-time value, the second point-in-time value, the first data storage medium, and the second data storage medium.

14. The non-transitory computer-readable storage medium of claim 13, wherein movement of the data image from the second data storage medium to the third data storage medium comprises a duplication operation, and wherein the second point-in-time value further indicates when to delete the data image on the second storage medium at least after movement of the data image is completed.

15. The non-transitory computer-readable storage medium of claim 13, wherein in addition to the identified second point-in-time value, allowance of the initial movement of the data image during the duplication operation is further qualified by at least one of the following: a current available capacity of the second data storage medium or the third storage medium, a business value of the data image, an age of the data image, and a size of the data image.

* * * * *

UNITED STATES PATENT AND TRADEMARK OFFICE
CERTIFICATE OF CORRECTION

PATENT NO.        : 8,812,436 B2            Page 1 of 1
APPLICATION NO.   : 12/773350
DATED             : August 19, 2014
INVENTOR(S)       : Alioune Thiam It is certified that error appears in the above-identified patent and that said Letters Patent is hereby corrected as shown below:

In the Claims:

Column 12, Claim 1, Lines 37-38, please delete "medium to a the" and substitute -- medium to the --.

Signed and Sealed this
Eleventh Day of November, 2014

Michelle K. Lee
*Deputy Director of the United States Patent and Trademark Office*